Figure 1:
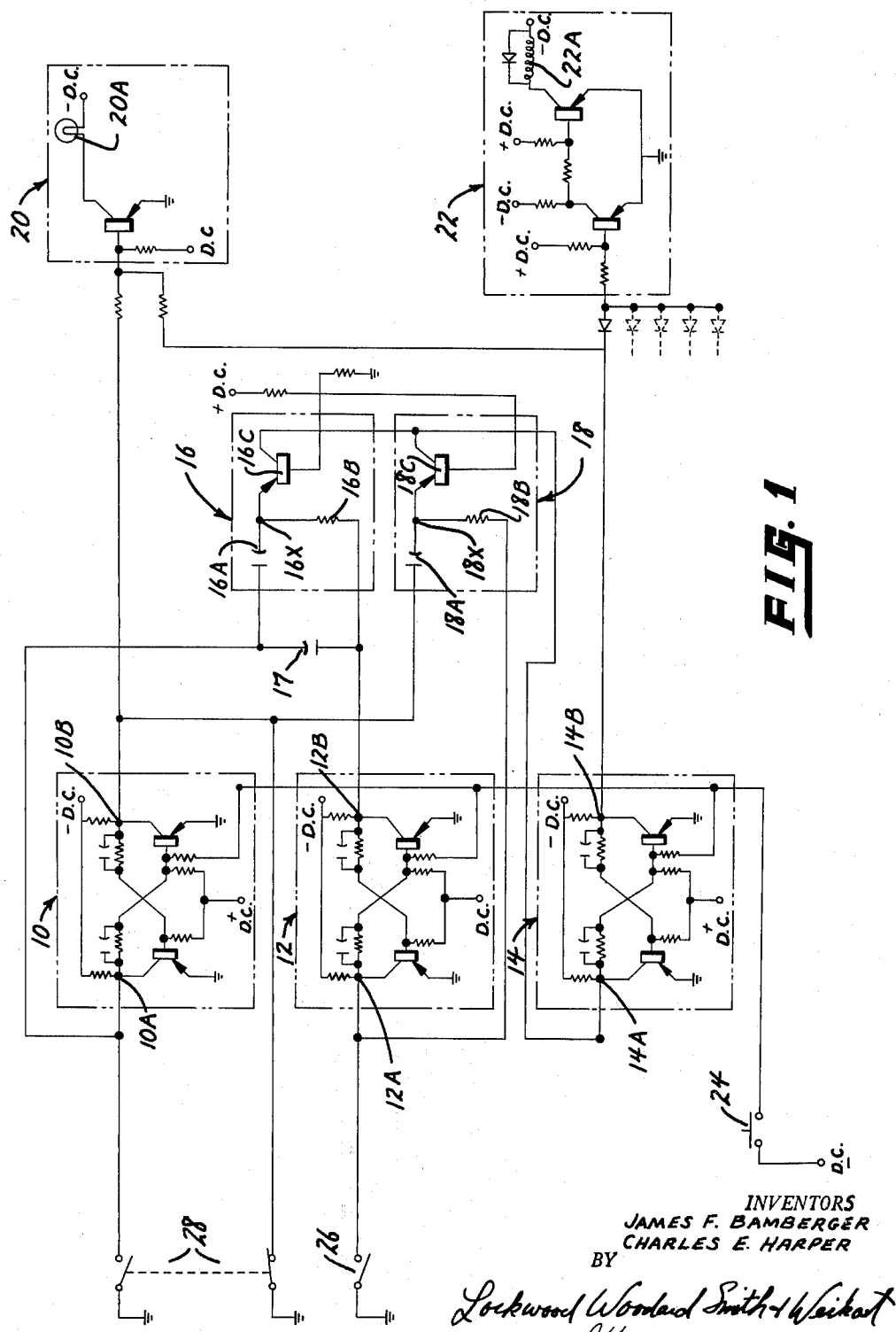

INVENTORS
JAMES F. BAMBERGER
CHARLES E. HARPER
BY
Lockwood Woodard Smith & Weikart
Attorneys United States Patent Office 3,204,114
Patented Aug. 31, 1965

3,204,114
BISTABLE CONTROL DEVICES CONTROLLING GATES TO EFFECT MACHINE CONTROL
James F. Bamberger and Charles E. Harper, Carmel, Ind., assignors, by mesne assignments, to Electro Products Laboratories, Inc., Chicago, Ill., a corporation of Illinois
Filed July 5, 1961, Ser. No. 121,951
1 Claim. (Cl. 307—88.5)

The present invention relates to a control device, and more particularly to a new and novel electronic control device for automated equipment.

With the advent of automation, it has become increasingly important to dependably ascertain malfunctioning machinery so as to minimize damage to such machinery, as well as to reduce scrap loss which may result because of such malfunctioning. Additionally, and by way of example, it has also become important to be able to detect the missing of a part in a particular production operation, or even the detection of a part not ejected from a die. Allied to the preceding is the desirability of being able to reliably determine when the source of feeding stock is exhausted, so that replacement may be made and production continued with no or a minimum interruption.

By virtue of the instant invention, the applicants have provided a dependable control device for automatically detecting the afore-stated desired end results for automated machinery and equipment, as, for example, punch presses, fourslides, wire machines, drill presses, screw machines and extrusion apparatus. The applicants' new and novel invention is founded on transistorized electronic circuitry which provides highly desirable flexibility in use, in that not only may different sensing or detecting activities be readily interchanged, but multiple sensing can be effected, with either of the preceding being dependably achieved at operational speeds, for example, of even over 1000 cycles per minute.

Briefly, the applicants' new and novel control device includes circuitry which broadly serves the functions of releasing a normally actuated relay if a momentary ground signal is applied to an input thereof; of releasing a normally actuated relay if a recurring momentary ground signal is missing; and, of releasing a normally actuated relay if a recurring momentary ground signal is maintained. In addition to the preceding, the circuitry provides signaling to indicate the part of the circuitry which has actuated the relay, as well as to indicate the presence of the proper signals.

Accordingly, the principal object of the present invention is to provide a new and novel electronic control device for automated equipment.

Another object of the present invention is to provide a new and novel electronic control device which dependably coacts with automated equipment to indicate various functions including, by way of example, the absence of a part; the malfunctioning of the apparatus; the depletion of stock; and the like.

A further and more general object of the present invention is to provide an automatic electronic control device for automated equipment having sensing or detecting components which rapidly and effectively indicate to the user any mis-application of equipment or material, and which, at the same time, functions reliably and dependably.

Other objects and a better understanding of the present invention should become apparent from the following description, taken in conjunction with the accompanying drawing, wherein FIG. 1 is a schematic diagram of the circuitry of the applicants' new and novel control device.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the drawing, the figure thereof principally illustrates the circuitry for the aforesaid functions of releasing a normally actuated relay if a recurring momentary ground signal is missing or of releasing a normally actuated relay if a recurring momentary ground signal is maintained, but an understanding of the aforesaid function of releasing a normally actuated relay if a momentary ground signal is applied to an input should also be apparent therefrom.

In any event, the circuitry of the drawing comprises three similar bistable circuits 10, 12 and 14, each of which includes conventional resistors, capacitors and transistors, so arranged that in a normal condition, a point 10A, 12A and 14A of each is at a negative voltage, while a point 10B, 12B and 14B of each is at zero voltage. In addition, gating circuits 16 and 18 are provided, where such circuits are respectively defined by capacitors 16A and 18A, resistors 16B and 18B, and transistors 16C and 18C, with a capacitor 17 being in the circuit between the gating circuit 16 and the bistable circuit 10.

The overall circuitry further includes a lamp driver circuit 20 having a lamp 20A therein, as well as a relay driver circuit 22 having a relay coil 22A, with the contacts for the latter (not shown) being included in the circuit for the automated machine under control. In this latter regard, the making or breaking of such contacts respectively energizes or de-energizes the controlled machine.

Power for all of the preceding circuitry is supplied from line voltage through a conventional A.C. to D.C. arrangement, and for this reason, the latter is not disclosed in the drawing.

The instant control device further includes one or more sensors or detectors for serving the function of, for example, detecting a part not ejected from a die; detecting the end of material, excessive bounce and/or a jammed reel, viz. stock check detection; detecting a missing part; protecting a die from causes of overloading; and, detecting the buckling of stock between feed and die. Each of the aforesaid functions may warrant a different type of sensor element. For example, in connection with the detection of missing parts, the sensor element typically comprises a base having a series of flexible feeler arms extending therefrom, where such sensor is positioned in the machine under control so as to be sensitive to the presence of the parts being processed.

Multiple sensing can be effectively achieved with the instant invention, and the circuitry associated with each is typically fed into the relay driver circuit 22 where shown by broken lines in the drawing. In any event, it should be understood that each sensing module might include a different type of sensor element per se.

Considering first the performance of the control device in regard to releasing a normally actuated relay if a momentary ground signal is applied to an input, the circuitry of the drawing is modified to include only the bistable circuit 14, the lamp driver circuit 20 and the relay driver circuit 22. A momentary ground signal at 14A, detected by a sensor responsive to the automated equipment, cause the normally negative voltage at 14A to go to ground and the normally zero voltage at 14B to become negative. At this time, the bistable circuit 14 is considered "set," and the aforesaid negative voltage is applied to the relay driver circuit 22, de-energizing the relay coil 22A and, hence, breaking the contacts which form a part of the controlled machine circuitry. Additionally, a negative voltage is applied to the lamp driver circuit 20, which results in the energizing of the lamp 20A therein. The overall circuitry remains in the aforedescribed condition until manually reset by a switch 24.

With reference now to the function of releasing a normally actuated relay if a recurring momentary ground signal is missed, the circuitry involved is as illustrated in FIG. 1 of the drawing. In order to effect operation, a parts switch 26 momentarily closes, i.e. upon coming into contact with a part, which momentary closing "sets" the bistable circuit 12 and, thereby, the normally negative voltage at 12A goes to ground and the normally zero voltage at 12B becomes negative. At such time, point 16X of the gating circuit 16 becomes negative voltage and point 18X of the gating circuit 18 becomes zero voltage.

Subsequently, a press switch 28, a contactor on the controlled machine which is operable only after the occurrence of a pulse (if any) from a parts switch 26, is actuated, which "sets" the bistable circuit 10, with the following occurring as the bistable circuit 10 "sets": (1) a positive going pulse travels from 10A through the capacitor 17 to 12B of the bistable circuit 12. The latter positive going pulse reduces the voltage at 12B to ground, which resets the bistable circuit 12. The positive going pulse from point 10A does not affect gate 16 which is clamped by the negative voltage from 12B. Following the above, the press switch 28 is released, and the bistable circuit 10 is reset, thereby sending a positive going pulse from 10B through the capacitor 18A to point 18X of the gating circuit 18, where the latter is blocked by a negative voltage.

The controlling effect, however, results when the parts switch 26 is not actuated by a part. In other words, the system misses a pulse, and there is no negative voltage applied to 16X in the gating circuit 16. Thereafter, when the bistable circuit 10 is set by the actuation of the press switch 28, the resulting positive going pulse is not blocked at 16X in gating circuit 16, and, thereby, such positive going pulse makes 16X positive with respect to the base of the transistor 16C forming part of the gating circuit 16. As a result, the transistor 16C conducts and permits the positive going pulse to proceed to 14A of bistable circuit 14, thereby "setting" the bistable circuit 14. As described hereabove, when 14A goes to ground, the relay 22A forming part of the relay driver circuit 22 is deactuated, thereby breaking its contacts in the machine circuit, and the lamp 20A of the lamp driver circuit 20 is energized.

Thus, with proper operation of the apparatus being controlled, three momentary sequential pulses are relayed into the applicants' control device. The first pulse is generated by the presence of a part, with the second and third pulses being derived by a contactor which is located on the controlled apparatus so that it will operate after the first pulse has occurred. If, therefore, the first pulse is missing, the apparatus shuts down immediately after receiving the second pulse.

Considering now the function of releasing a normally actuated relay if a recurring momentary ground signal is maintained, the parts switch 26, in this instance, is actuated, but not released. As described hereabove, the bistable circuit 10 is set by the actuation of the press switch 28, and the resulting positive going pulse is blocked by the negative voltage at point 16X of the gating circuit 16. However, now the positive going pulse cannot reset the bistable circuit 12 because the latter is clamped in a "set" position by the parts switch 26.

Accordingly, when the bistable circuit 10 is reset by the release of the press switch 28, a positive going pulse from 10B passes through the capacitor 18A forming part of the gating circuit 18. As 18X, being connected to the positive voltage at 12A of the bistable circuit 12, is at zero voltage, the aforesaid positive going pulse passes through the transistor 18C of the gating circuit 18, and, thereby, "sets" the bistable circuit 14.

When the latter occurs, and as discussed hereabove, the relay 22A of the relay driver circuit 22 is deactuated, the lamp 20A of the lamp driver circuit 20 is energized, and, of course, operation of the automated equipment ceases.

It should be noted that whenever the bistable circuit 10 is "set," the lamp 20A is energized through the connection from 10B of the bistable circuit 10 to the lamp driver circuit 20. Thus, whenever there is a negative voltage at 10B of the bistable circuit 10, the lamp 20A is energized, thereby providing visual indication that the bistable circuit 10 is energized.

In connection with the gating circuits 16 and 18, the importance of the timing provided thereby should be understood, as the size of the capacitors 16A and 18A and of the resistors 16B and 18B (0.001 µfd. and 22K ohms, respectively, in the preferred form of the invention) delay the decay of the negative voltage after the reset of the bistable circuit 12, which permits the same going pulse to block the gate as well as to reset the bistable circuit 12.

From the preceding, it should be apparent that the applicants have provided a new and novel control device having a highly effective use in connection with automated equipment. As the contacts for the relay in the relay driver circuit 22 are connected into the circuitry for the automated equipment, positive control of the latter is always provided. Moreover, and by way of restatement, the control device provides three approaches to safety, including the stopping of a controlled machine after a momentary ground is completed by a sensor; the stopping of a controlled machine if a contact is not made and released (a moving part passing by a sensor); and, the stopping of a controlled machine if a recurring ground is maintained.

Although the preceding description has been primarily in connection with control of automated equipment, it should be understood that the invention may be used in other applications and that, accordingly, the above discussion should be considered illustrative, and not as limiting the scope of the following claim.

We claim:

An automatic machine control of the character described for a cylically operating machine, comprising: control means normally maintaining a machine in operative condition; a first bistable circuit having first and second conditions; condition sensing means responsive to parts on which said machine operates for actuating said first bistable circuit from the first to the second condition; a second bistable circuit having first and second output conditions; each of said bistable circuits having a first and a second output terminal, said first terminal carrying a first output signal level and said second terminal carrying a second output signal level when said each bistable circuit is in its first condition, and said first terminal carrying said second output signal level and said second terminal carrying said first output signal level when said each bistable circuit is in its second condition; means actuating said second bistable circuit in accordance with operation of said machine from the first to the second condition thereof upon initiation of a cycle of operation and from the second condition to the first condition on completion of a cycle of operation; means connecting said first output terminal of said second bistable circuit with said first bistable circuit to actuate the first bistable circuit from the second condition to the first condition thereof upon actuation of the second bistable circuit from the first condition to the second condition thereof; a first gate circuit having a first control element connected to said second output terminal of the first bistable circuit, said gate circuit having open and closed conditions, and being open only in the first condition of said first bistable circuit wherein said second output signal level is applied to said first control element, said first gate circuit having an input connected to the first output terminal of said second bistable circuit, to transmit, when open, a pulse signal on actuation of the second bistable circuit from the first condition to the second condition, a second gate circuit having a second control element connected to said first output terminal of said first bistable circuit said gate circuit having open and closed conditions, and being open only in the second condition of said first bistable circuit wherein said second output signal level is applied to said second control element, said second gate circuit having an input connected to the second output terminal of said second bistable circuit to transmit, when open, a pulse signal on actuation of the second bistable circuit from the second condition to the first condition; and means connecting the outputs of each of said gates with said control means to render said machine inoperative on passage of a pulse signal through one of said gates.

References Cited by the Examiner
UNITED STATES PATENTS

| | | | |
|---|---|---|---|
| 2,848,607 | 8/58 | Maron | 328—95 |
| 2,956,175 | 10/60 | Bothwell | 307—88.5 |
| 2,995,664 | 4/61 | Deuitch | 307—88.5 |
| 3,018,442 | 1/62 | Goodman | 328—171 |
| 3,020,418 | 2/62 | Emile | 307—88.5 |

ARTHUR GAUSS, *Primary Examiner.*

HERMAN K. SAALBACH, *Examiner.*